(12) United States Patent
Schena

(10) Patent No.: US 7,182,691 B1
(45) Date of Patent: Feb. 27, 2007

(54) DIRECTIONAL INERTIAL TACTILE FEEDBACK USING ROTATING MASSES

(75) Inventor: Bruce M. Schena, Menlo Park, CA (US)

(73) Assignee: Immersion Corporation, San Jose, CA (US)

( * ) Notice: Subject to any disclaimer, the term of this patent is extended or adjusted under 35 U.S.C. 154(b) by 591 days.

(21) Appl. No.: 09/968,725

(22) Filed: Sep. 28, 2001

Related U.S. Application Data

(60) Provisional application No. 60/236,897, filed on Sep. 28, 2000.

(51) Int. Cl.
*A63F 13/00* (2006.01)

(52) U.S. Cl. .............................. 463/38; 345/161; 463/36
(58) Field of Classification Search ............. 463/36–38, 463/46–47; 345/156, 161, 163
See application file for complete search history.

(56) References Cited

U.S. PATENT DOCUMENTS

| 2,972,140 | A | 2/1961 | Hirsch |
| 3,157,853 | A | 11/1964 | Hirsch |
| 3,220,121 | A | 11/1965 | Cutler |

(Continued)

FOREIGN PATENT DOCUMENTS

| EP | 0265011 A1 | 4/1988 |
| EP | 0 349 086 A1 | 1/1990 |
| EP | 0626634 A2 | 11/1994 |
| JP | H2-185278 | 7/1990 |
| JP | H4-8381 | 1/1992 |
| JP | H5-192449 | 8/1993 |
| JP | H7-24147 | 1/1995 |
| WO | 9200559 | 1/1992 |
| WO | 0103105 A1 | 1/2001 |
| WO | 0113354 A1 | 2/2001 |
| WO | 0124158 | 4/2001 |

OTHER PUBLICATIONS

Baigrie, "Electric Control Loading—A Low Cost, High Performance Alternative," *Proceedings of Interservice/Industry Training Systems Conference*, pp. 247–254, Nov. 6–8, 1990.

Iwata, "Pen–based Haptic Virtual Environment," 0–7803–1363–1/93 IEEE, pp. 287–292, 1993.

Russo, "The Design and Implementation of a Three Degree of Freedom Force Output Joystick," *MIT Laboratories Archives* pp. 1–131, May 1990, archived Aug. 14, 1990.

Brooks et al., "Hand Controllers for Teleoperation—A State–of–the–Art Technology Survey and Evaluation," *JPL Publication 85–11*, NASA–CR–175890; N85–28559, pp. 1–84, Mar. 1, 1985.

(Continued)

*Primary Examiner*—John M. Hotaling, II
(74) *Attorney, Agent, or Firm*—Thelen Reid Brown Raysman and Steiner LLP

(57) ABSTRACT

Directional haptic feedback for a haptic feedback interface device. A haptic feedback interface device, in communication with a host computer, includes a housing physically contacted by a user operating the interface device, and a plurality of actuators producing inertial forces when the actuators are driven by control signals. Each of the actuators includes a rotatable eccentric mass positioned offset on a rotating shaft of the actuator, where the actuators are rotated simultaneously such that centrifugal forces from the rotation of masses combine to output the inertial forces substantially only along a single axis having a desired direction approximately in a plane of rotation of the masses.

22 Claims, 6 Drawing Sheets

U.S. PATENT DOCUMENTS

| | | | |
|---|---|---|---|
| 3,497,668 | A | 2/1970 | Hirsch |
| 3,517,446 | A | 6/1970 | Corlyon et al. |
| 3,623,064 | A | 11/1971 | Kagan |
| 3,902,687 | A | 9/1975 | Hightower |
| 3,903,614 | A | 9/1975 | Diamond et al. |
| 3,911,416 | A | 10/1975 | Feder |
| 3,919,691 | A | 11/1975 | Noll |
| 3,994,282 | A | 11/1976 | Moulet |
| 4,050,265 | A | 9/1977 | Drennen et al. |
| 4,127,752 | A | 11/1978 | Lowthorp |
| 4,131,033 | A | 12/1978 | Wright et al. |
| 4,160,508 | A | 7/1979 | Salisbury, Jr. et al. |
| 4,197,488 | A | 4/1980 | Kant |
| 4,236,325 | A | 12/1980 | Hall et al. |
| 4,262,549 | A | 4/1981 | Schwellenbach |
| 4,333,070 | A | 6/1982 | Barnes |
| 4,414,984 | A | 11/1983 | Zarudiansky |
| 4,436,188 | A | 3/1984 | Jones |
| 4,464,117 | A | 8/1984 | Foerst |
| 4,484,191 | A | 11/1984 | Vavra |
| 4,513,235 | A | 4/1985 | Acklam et al. |
| 4,581,491 | A | 4/1986 | Boothroyd |
| 4,599,070 | A | 7/1986 | Hladky et al. |
| 4,706,294 | A | 11/1987 | Ouchida |
| 4,708,656 | A | 11/1987 | de Vries et al. |
| 4,713,007 | A | 12/1987 | Alban |
| 4,731,603 | A | 3/1988 | McRae |
| 4,794,392 | A | 12/1988 | Selinko |
| 4,795,296 | A | 1/1989 | Jau |
| 4,868,549 | A | 9/1989 | Affinito |
| 4,885,565 | A | 12/1989 | Embach |
| 4,891,764 | A | 1/1990 | McIntosh |
| 4,897,582 | A | 1/1990 | Otten et al. |
| 4,930,770 | A | 6/1990 | Baker |
| 4,933,584 | A | 6/1990 | Harms et al. |
| 4,934,694 | A | 6/1990 | McIntosh |
| 5,019,761 | A | 5/1991 | Kraft |
| 5,022,384 | A | 6/1991 | Freels et al. |
| 5,022,407 | A | 6/1991 | Horch et al. |
| 5,035,242 | A | 7/1991 | Franklin et al. |
| 5,038,089 | A | 8/1991 | Szakaly |
| 5,078,152 | A | 1/1992 | Bond et al. |
| 5,103,404 | A | 4/1992 | McIntosh |
| 5,107,262 | A | 4/1992 | Cadoz |
| 5,146,566 | A | 9/1992 | Hollis, Jr. |
| 5,165,897 | A | 11/1992 | Johnson |
| 5,172,092 | A | 12/1992 | Nguyen et al. |
| 5,175,459 | A | 12/1992 | Danial et al. |
| 5,184,319 | A | 2/1993 | Kramer |
| 5,186,629 | A | 2/1993 | Rohen |
| 5,186,695 | A | 2/1993 | Mangseth et al. |
| 5,203,563 | A | 4/1993 | Loper, III |
| 5,212,473 | A | 5/1993 | Louis |
| 5,240,417 | A | 8/1993 | Smithson et al. |
| 5,245,245 | A | 9/1993 | Goldenberg |
| 5,271,290 | A | 12/1993 | Fischer |
| 5,275,174 | A | 1/1994 | Cook |
| 5,283,970 | A | 2/1994 | Aigner |
| 5,296,871 | A | 3/1994 | Paley |
| 5,299,810 | A | 4/1994 | Pierce et al. |
| 5,309,140 | A | 5/1994 | Everett, Jr. et al. |
| 5,327,790 | A | 7/1994 | Levin et al. |
| 5,334,027 | A | 8/1994 | Wherlock |
| 5,354,162 | A | 10/1994 | Burdea |
| 5,388,992 | A | 2/1995 | Franklin |
| 5,399,091 | A | 3/1995 | Mitsumoto |
| 5,405,152 | A | 4/1995 | Katanics |
| 5,436,622 | A | 7/1995 | Gutman et al. |
| 5,437,607 | A | 8/1995 | Taylor |
| 5,437,608 | A | 8/1995 | Cutler |
| 5,440,183 | A | 8/1995 | Denne |
| 5,466,213 | A | 11/1995 | Hogan et al. |
| 5,547,382 | A | 8/1996 | Yamasaki et al. |
| 5,554,900 | A | 9/1996 | Pop, Sr. |
| 5,565,840 | A | 10/1996 | Thorner |
| 5,575,761 | A | 11/1996 | Hajianpour |
| 5,580,251 | A | 12/1996 | Gilkes |
| 5,583,478 | A | 12/1996 | Renzi |
| 5,587,937 | A | 12/1996 | Massie |
| 5,589,828 | A | 12/1996 | Armstrong |
| 5,601,529 | A | 2/1997 | Wollman |
| 5,619,180 | A | 4/1997 | Massimino |
| 5,631,861 | A | 5/1997 | Kramer |
| 5,643,087 | A | 7/1997 | Marcus |
| 5,649,020 | A | 7/1997 | McClurg et al. |
| 5,650,704 | A | 7/1997 | Pratt et al. |
| 5,661,446 | A | 8/1997 | Anderson |
| 5,669,818 | A | 9/1997 | Thorner |
| 5,684,722 | A | 11/1997 | Thorner |
| 5,690,582 | A | 11/1997 | Ulrich et al. |
| 5,691,898 | A * | 11/1997 | Rosenberg et al. ........... 463/38 |
| 5,709,219 | A | 1/1998 | Chen |
| 5,714,978 | A | 2/1998 | Yamanaka |
| 5,734,373 | A | 3/1998 | Rosenberg |
| 5,736,978 | A | 4/1998 | Hasser et al. |
| 5,739,811 | A | 4/1998 | Rosenberg |
| 5,742,278 | A | 4/1998 | Chen |
| 5,754,023 | A | 5/1998 | Roston |
| 5,766,016 | A | 6/1998 | Sinclair et al. |
| 5,781,172 | A | 7/1998 | Engel |
| 5,784,052 | A | 7/1998 | Keyson |
| 5,785,630 | A | 7/1998 | Bobick et al. |
| 5,790,108 | A | 8/1998 | Salcudean |
| 5,805,140 | A | 9/1998 | Rosenberg |
| 5,857,986 | A | 1/1999 | Moriyasu |
| 5,861,699 | A | 1/1999 | Kopac |
| 5,889,672 | A | 3/1999 | Schuler |
| 5,894,263 | A | 4/1999 | Shimakawa |
| 5,896,076 | A | 4/1999 | van Namen |
| 5,897,437 | A | 4/1999 | Nishiumi |
| 5,914,705 | A | 6/1999 | Johnson |
| 5,945,772 | A | 8/1999 | Macnak |
| 5,973,670 | A | 10/1999 | Barber |
| 5,984,880 | A | 11/1999 | Lander |
| 5,986,643 | A | 11/1999 | Harvill |
| 6,001,014 | A | 12/1999 | Ogata |
| 6,002,184 | A | 12/1999 | Delson et al. |
| 6,004,134 | A | 12/1999 | Marcus |
| 6,044,646 | A | 4/2000 | Silverbrook |
| 6,057,753 | A | 5/2000 | Myers |
| 6,078,126 | A | 6/2000 | Rollins |
| 6,088,017 | A | 7/2000 | Tremblay |
| 6,088,019 | A | 7/2000 | Rosenberg |
| 6,104,158 | A | 8/2000 | Jacobus |
| 6,111,577 | A | 8/2000 | Zilles et al. |
| 6,147,422 | A | 11/2000 | Delson et al. |
| 6,160,489 | A | 12/2000 | Perry et al. |
| 6,184,868 | B1 | 2/2001 | Shahoian |
| 6,198,206 | B1 | 3/2001 | Saarmaa |
| 6,211,861 | B1 | 4/2001 | Rosenberg |
| 6,218,966 | B1 | 4/2001 | Goodwin et al. |
| 6,275,213 | B1 | 8/2001 | Tremblay |
| 6,317,032 | B1 | 11/2001 | Oishi |
| 6,324,928 | B1 | 12/2001 | Hughes |
| 6,404,107 | B1 | 6/2002 | Lazarus et al. |
| 6,422,941 | B1 | 7/2002 | Thorner et al. |
| 6,424,333 | B1 | 7/2002 | Tremblay |
| 6,563,487 | B2 | 5/2003 | Martin |
| 6,585,595 | B1 | 7/2003 | Soma |
| 2002/0030663 | A1 | 3/2002 | Tierling |
| 2002/0080112 | A1 * | 6/2002 | Braun et al. ................ 345/156 |

OTHER PUBLICATIONS

Jones et al., "A perceptual analysis of stiffness," ISSN 0014–4819 Springer International (Springer–Verlag); *Experimental Brain Research*, vol. 79, No. 1, pp. 150–156, 1990.

Burdea et al., "Distributed Virtual Force Feedback, Lecture Notes for Workshop on Force Display in Virtual Environments and its Application to Robotic Teleoperation," *1993 IEEE International Conference on Robotics and Automation*, pp. 25–44, May 2, 1993.

Snow et al., Model–X Force–Reflecting–Hand–Controller, NT Control No. NPO–17851; JPL Case No. 7348, pp. 1–4 with 45 pages of attachments, Jun. 15, 1989.

Ouh–Young, "Force Display in Molecular Docking," Doctoral Dissertation, University of North Carolina at Chapel Hill, UMI Order No. 9034744, p. 1–369, 1990.

Tadros, "Control System Design for a Three Degree of Freedom Virtual Environment Simulator Using Motor/Brake Fair Actuators," *MIT Archive*, pp. 1–88, Feb. 1990, archived Aug. 13, 1990.

Caldwell et al., "Enhanced Tactile Feedback (Tele–Taction) Using a Multi–Functional Sensory System," 1050–4729/93, pp. 955–960, 1993.

Adelstein et al., "Design and Implementation of a Force Reflecting Manipulation for Manual Control research," DSC–vol. 42, *Advances in Robotics*, pp. 1–12, 1992.

Gotow et al., "Controlled Impedance Test Apparatus for Studying Human Interpretation of Kinesthetic Feedback," WA11–11:00, pp. 332–337.

Stanley et al., "Computer Simulation of Interacting Dynamic Mechanical Systems Using Distributed Memory Parallel Processors," DSC–vol. 42, *Advances in Robotics*, pp. 55–61, ASME 1992.

Russo, "Controlling Dissipative Magnetic Particle Brakes in Force Reflective Devices," DSC–vol. 42, *Advances in Robotics*, pp. 63–70, ASME 1992.

Kontarinis et al., "Display of High–Frequency Tactile Information to Teleoperators," *Telemanipulator Technology and Space Telerobotics*, Won S. Kim, Editor, Proc. SPIE vol. 2057, pp. 40–50, Sep. 7–9, 1993.

Patrick et al., "Design and Testing of A Non–reactive, Fingertip, Tactile Display for Interaction with Remote Environments," *Cooperative Intelligent Robotics in Space* Rui J. deFigueiredo et al, Editor, Proc. SPIE, vol. 1387, pp. 215–222, 1990.

Adelstein, "A Virtual Environment System For The Study of Human Arm Tremor," *Ph.D. Dissertation*, Dept. of Mechanical Engineering, MIT, Jun. 1989, archived Mar. 13, 1990.

Bejczy, "Sensors, Controls, and Man–Machine Interface for Advanced Teleoperation," *Science*, vol. 208, No. 4450, pp. 1327–1335, 1980.

Bejczy et al., "Generalization of Bilateral Force–Reflecting Control of Manipulators," *Proceedings Of Fourth CISM–IfToMM*, Sep. 8–12, 1981.

McAffee et al., "Teleoperator Subsystem/Telerobot Demonstrator: Force Reflecting Hand Controller Equipment Manual," *JPL* 1988, JPL D–5172.

Minsky, "Computational Haptics: The Sandpaper System for Synthesizing Texture for a Force–Feedback Display," *Ph.D. Dissertation*, MIT, Jun. 1995, archived Jul. 6, 1995.

Jacobsen et al., "High Performance Dextrous Telerobotic Manipulator With Force Reflection," *Intervention/ROV '91 Conference & Exposition*, Hollywood, Florida, May 21–23, 1991.

Shimoga, "Finger Force and Touch Feedback Issues in Dexterous Telemanipulation," *Proceedings of Fourth Annual Conference on Intelligent Robotic Systems for Space Exploration*, Rensselaer Polytechnic Institute, Sep. 30–Oct. 1, 1992.

IBM Technical Disclosure Bulletin, "Mouse Ball–Actuating Device With Force and Tactile Feedback," vol. 32, No. 9B, Feb. 1990.

Terry et al., "Tactile Feedback In A Computer Mouse," *Proceedings of Fourteenth Annual Northeast Bioengineering Conference, University of New Hampshire*, Mar. 10–11, 1988.

Howe, "A Force–Relating Teleoperated Hand System for the Study of Tactile Sensing in Precision Manipulation," *Proceedings of the 1992 IEEE International Conference on Robotics and Automation*, Nice, France, May 1992.

Eberhardt et al., "OMAR—A Haptic display for speech perception by deaf and deaf–blind individuals," *IEEE Virtual Reality Annual International Symposium*, Seattle, WA, Sep. 18–22, 1993.

Rabinowitz et al., "Multidimensional tactile displays: Identification of vibratory intensity, frequency, and contractor area," *Journal of The Acoustical Society of America*, vol. 82, No. 4, Oct. 1987.

Bejczy et al., "Kinesthetic Coupling Between Operator and Remote Manipulator," *International Computer Technology Conference, The American Society of Mechanical Engineers*, San Francisco, CA, Aug. 12–15, 1980.

Bejczy et al., "A Laboratory Breadboard System For Dual–Arm Teleoperation," *SOAR '89 Workshop, JSC*, Houston, TX, Jul. 25–27, 1989.

Ouhyoung et al., "A Low–Cost Force Feedback Joystick and Its Use in PC Video Games," *IEEE Transactions on Consumer Electronics*, vol. 41, No. 3, Aug. 1995.

Marcus, "Touch Feedback in Surgery," *Proceedings of the Virtual Reality and Machine The Cutting Edge*, Sep. 8–11, 1994.

Bejczy, et al., "Universal Computer Control System (UCCS) For Space Telerobots," CH2413–3/87/0000/0318501.00 1987, IEEE, 1987.

Patrick, "Design, Construction, and Testing of a Fingertip Tactile Display for Interaction with Virtual and Remote Environments," *Master of Science Thesis*, MIT, Aug. 1990, archived Nov. 8, 1990.

Calder, "Design of a Force–Feedback Touch–Introducing Actuator For Teleoperator Robot Control," *Bachelor of Science Thesis*, MIT, May 1983, archived Jun. 23, 1983.

Wiker, "Teletouch Display Development: Phase 1 Report," *Technical Report 1230*, Naval Ocean Systems Center, San Diego, Jul. 1988.

Bliss, "Optical–to–Tactile Image Conversion for the Blind," *IEEE Transactions on Man–Machine Systems*, vol. MMS–11, No. 1, Mar. 1970.

Johnson, "Shape–Memory Alloy Tactile Feedback Actuator," *Armstrong Aerospace Medical Research Laboratory*, AAMRL–TR–90–039, Aug. 1990.

Kontarinis et al., "Tactile Display of Vibratory Information In Teleoperation and Virtual Environments," Presence, 4(4):387–402, Harvard Univ., 1995.

Aukstakalnis et al., "Silicon Mirage: The Art and Science of Virtual Reality," ISBN 0-938151-82-7, pp. 129-180, 1992.

Eberhardt et al., "Inducing Dynamic Haptic Perception by The Hand: System Description and Some Results," DSC-vol. 55-1, *Dynamic Systems and Control:* vol. 1, ASME 1994.

Gobel et al., "Tactile Feedback Applied to Computer Mice," *International Journal of Human-Computer Interaction,* vol. 7, No. 1, pp. 1-24, 1995.

Pimental et al., "Virtual Reality: through the new looking glass," $2^{nd}$ Edition; McGraw-Hill, ISBN 0-07-050167-X, pp. 41-202, 1994.

"Cyberman Technical Specification," *Logitech Cyberman SWIFT Supplement to Logitech Mouse Technical Reference and Programming Guide,* Apr. 5, 1994.

Ouhyoung et al., "The Development of A Low-Cost Force Feedback Joystick and Its Use in the Virtual Reality Environment," *Proceedings of the Third Pacific Conference on Computer Graphics and Applications, Pacific Graphics '95,* Seoul, Korea, Aug. 21-24 1995.

Kaczmarek et al., "Tactile Displays," *Virtual Environment Technologies,* Chap. 9, pp. 349-414.

Lake, "Cyberman from Logitech," at http://www.ibiblio.org/GameBytes/issue21/greviews/cyberman.html, 1994.

"Component Maintenance Manual With Illustrated Parts List, Coaxial Control Shaker Part No. C-25502," Safe Flight Instrument Corporation, Revised Jan. 28, 2002 (3 pages).

"Technical Manual Overhaul Instructions With Parts Breakdown, Coaxial Control Shaker Part No. C-25502," Safe Flight Instrument Corporation, Revised Jul. 15, 1980 (23 pages).

Scannell, "Taking a Joystick Ride," *Computer Currents,* Boston Edition, vol. 9, No. 11, Nov. 1994.

Yamakita et al., "Tele-Virtual Reality of Dynamic Mechanical Model," *Proceedings of the 1992 IEEE/RSJ International Conference on Intelligent Robots and Systems,* Raleigh, NC, Jul. 7-10, 1992.

Noll, "Man-Machine Tactile," *SID Journal,* Jul./Aug. 1972 Issue.

Rosenberg, "Virtual Fixtures: Perceptual Overlays Enhance Operator Performance In Teleprescene Tasks," *Ph.D. Dissertation,* Stanford University, Jun. 1994.

* cited by examiner

DIRECTIONAL INERTIAL TACTILE FEEDBACK USING ROTATING MASSES

CROSS REFERENCE TO RELATED APPLICATIONS

This application claims the benefit of U.S. Provisional Application No. 60/236,897, filed Sep. 28, 2000, entitled, "Directional Inertial Tactile Feedback Using Rotating Masses," which is incorporated herein by reference in its entirety.

BACKGROUND OF THE INVENTION

The present invention relates generally to tactile human-computer interface devices, and more specifically to enhancing vibration feedback in such interface devices.

Computer devices are widely used for activities such as playing games. Currently, popular gaming computer devices include game consoles connected to a home television set, such as the Nintendo® 64 from Nintendo Corp., the Playstation® from Sony Corp., the X-box from Microsoft Corp., and the Dreamcast™ from Sega Corp. Gaming computer devices also include personal computers, such as Windows PCs, Macintosh computers, and others. Also, portable computer devices are often used for entertainment purposes, such as Game Boy® from Nintendo, personal digital assistants such as PalmPilot® from Palm Computing, and laptop computers. These devices can be used for other activities as well.

Users of computer devices typically interact with a game or other application program using an interface device connected to the host computer (e.g. game console). Such interface devices may include joysticks, gamepads, knobs, mice, trackballs, styluses, steering wheels, or other devices. A user moves a user manipulatable object (manipulandum), such as a joystick, wheel, mouse, button, dial, or other object, which is sensed by the host computer and used to manipulate a graphical environment displayed by the host computer. Recently, haptic feedback has become available in interface devices, where the host computer and/or a processor on the interface device controls one or more motors to output forces to the user. These forces are correlated with events or objects in the graphical environment to further immerse the user in the gaming experience or interface task. Herein, the term "haptic feedback" is intended to include both tactile feedback (forces transmitted to user skin surfaces) and kinesthetic feedback (forces provided in degree(s) of freedom of motion of the manipulandum).

In some markets such as the game console market, products are typically produced in high volume and low cost. In these markets, haptic feedback interface devices have been typically limited to simpler embodiments that provide more limited forms of haptic feedback, such as tactile inertial feedback. Existing haptic feedback "gamepad" controllers (or add-on hardware for gamepad controllers) that are used to interface with games running on game consoles include the Dual Shock™ from Sony Corp., the Rumble Pak™ from Nintendo Corp., and the Jump Pack from Sega Corp, as well as other types of handheld controllers such as the MadCatz Dual Force Racing Wheel. These devices are inertial tactile feedback controllers which employ one or more motors to shake the housing of the controller and thus provide output sensations, such as vibrations, to the user which are correlated to game events and interactions. Typically, an eccentric rotating mass (ERM) motor, i.e., pager motor, is used to generate sensations on the controller and thus to the user. The motor is rigidly coupled to the controller housing and provides a inertial mass on a rotating shaft offset from the axis of rotation, so that when the shaft is rotated, the inertial forces from the mass rock the motor and the gamepad housing back and forth. Additional motors are used to provide stronger forces or to output force sensations of different frequencies or magnitudes.

One problem with such existing tactile controllers is that they can provide output inertial forces only in the general directions ("swirl") of the rotating mass. The sensations thus feel to the user as if they are not output in any particular direction, but are simply output on the housing of the device. However, many events in games and other computer-implemented environments are direction-based. For example, in a driving game, the user may be driving a vehicle that impacts a side wall, or gets impacted by another vehicle. These events should cause directional forces on the interface device to allow the user a more realistic simulation of the event; thus if the user's car is impacted on the left, a force should be output on the device in the corresponding direction. However, the haptic inertial devices currently available do not allow such directional output of inertial forces.

SUMMARY OF THE INVENTION

The present invention is directed toward providing directional haptic feedback for a haptic feedback interface device.

More particularly, a haptic feedback interface device of the present invention is in communication with a host computer and outputs directional inertial sensations to a user which can be based on interactions and events occurring in a graphical environment displayed by the host computer. The device includes a housing physically contacted by a user operating the interface device, and a plurality of actuators producing inertial forces when the actuators are driven by control signals. Each of the actuators includes a rotatable eccentric mass positioned offset on a rotating shaft of the actuator, where the actuators are rotated simultaneously such that centrifugal forces from the rotation of masses combine to output the inertial forces substantially only along a single axis having a desired direction approximately in a plane of rotation of the masses.

A phase difference between the eccentric masses of the actuators can determine a direction of the single desired axis. The eccentric masses can be rotated in opposite directions. The actuators can be positioned side-by-side such that axes of rotation of the masses are approximately parallel, or the actuators can be positioned facing each other such that axes of rotation of the masses are approximately colinear. Each actuator can include a sensor that detects a rotational position of the eccentric mass. The desired directional axis of output can be determined by an event or interaction occurring within said graphical environment, such as a collision in a game. A method of the present invention provides a phase difference between eccentric masses and rotates the eccentric masses to provide inertial sensations along a desired direction.

The present invention advantageously provides a device that provides directional tactile feedback sensations in a low cost interface device, which allows for much greater varieties and types of sensations for such interface devices. This allows the experience of playing a game or interacting with other types of computer applications to be more realistic and compelling for the user.

These and other advantages of the present invention will become apparent to those skilled in the art upon a reading of

DETAILED DESCRIPTION OF THE PREFERRED EMBODIMENTS

This application describes techniques and devices that provide directional inertial forces for tactile feedback devices using rotating mass actuators. Herein, the term "inertial tactile feedback device" or "inertial feedback device" is intended to refer to any controller or interface device that outputs inertial forces to the user of the device with respect to an inertial mass (acting as an inertial ground), and can include gamepads, handheld steering wheels, fishing-type controllers, joysticks or handles thereof, mice, trackballs, adult devices, grips, remote controls, handheld game devices, flat screens, styluses, etc.

Figure 1:
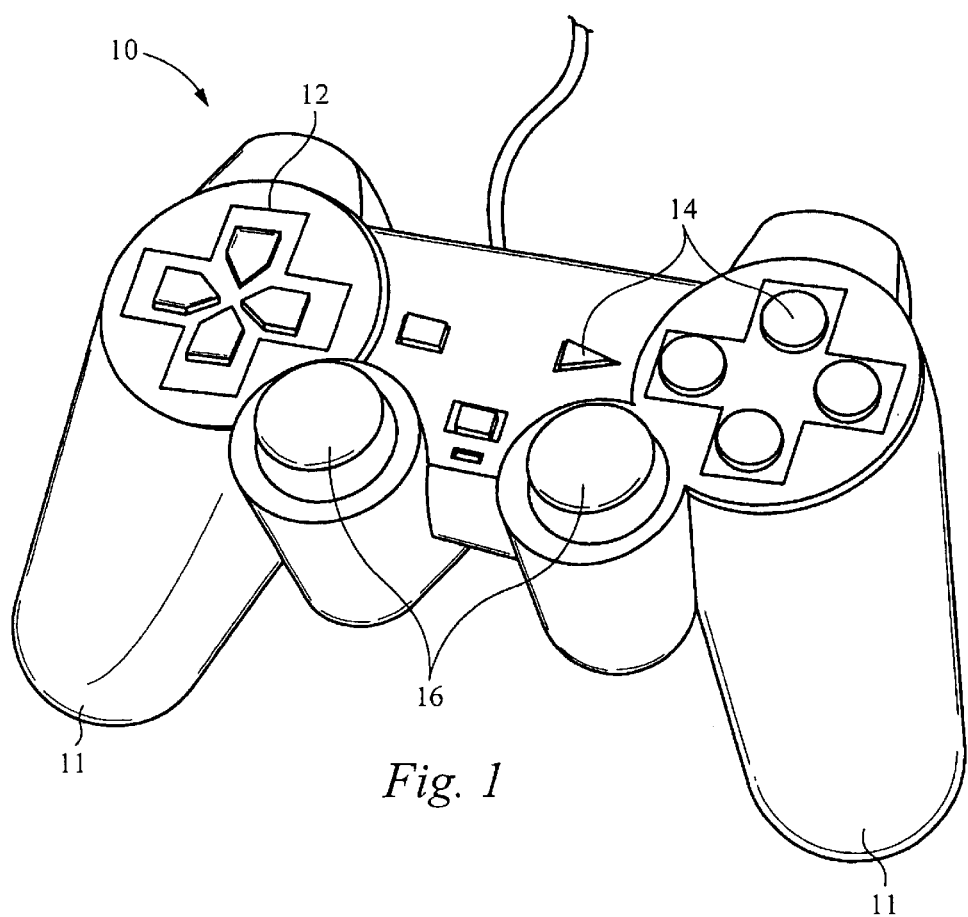
FIG. 1 is a perspective view of a gamepad controller which is suitable for use with the present invention.

FIG. 1 is a perspective view of a gamepad controller 10 which is suitable for use with the present invention. Controller 10 is preferably connected to a host computer, such as a game console unit, personal computer, or other device, as described below. Controller 10 can include a direction pad ("d-pad") 12 for directional user input, buttons 14 for button user input, and/or one or more joysticks 16 for directional user input. Controller 10 also includes two or more actuators coupled to the interior of the housing of the controller. The user typically grasps both grips 11 while operating the controller to feel inertial sensations such as vibrations through the housing of the controller output by the actuators. For example, gamepad controllers for use with console gaming systems, such as those available from Sony, Nintendo, or Sega, can be modified for use with the present invention.

Controller 10 can use two or more individual actuators, each actuator having an eccentric rotating mass (ERM). The preferred actuator assemblies for use in the present invention are described below with reference to FIGS. 3 and 4. Individual games running on the host console unit (or other host computer) may control when the actuators are activated by sending commands or signals to the controllers to correlate haptic feedback with game events. Alternatively, the games can provide high level commands to a processor on the device, as described below.

In its most direct operation, the ERM can be rotated in only one direction at a desired frequency to produce an inertial oscillating force or vibration at that frequency. Each output frequency has a magnitude associated with it, so that high frequency vibrations tend to have higher magnitudes than low frequency vibrations. Alternatively, control techniques can be used to independently control magnitude and frequency of vibrations output by an ERM driven in only one direction. For example, a pulse can be applied each period of the sine wave to cause oscillations or pulses at a desired frequency and magnitude. Several of these techniques are disclosed in copending application Ser. No. 09/669,029, filed Sep. 25, 2000, and incorporated herein by reference in its entirety.

In alternate embodiments, other types of interface devices can be used with the present invention, such as handheld or surface-grounded steering wheels, fishing-type controllers, joysticks, mice, knobs, trackballs, adult devices, grips, remote controls, PDA's, handheld game devices, flat screens, cell phones, styluses, etc.

Figure 2:
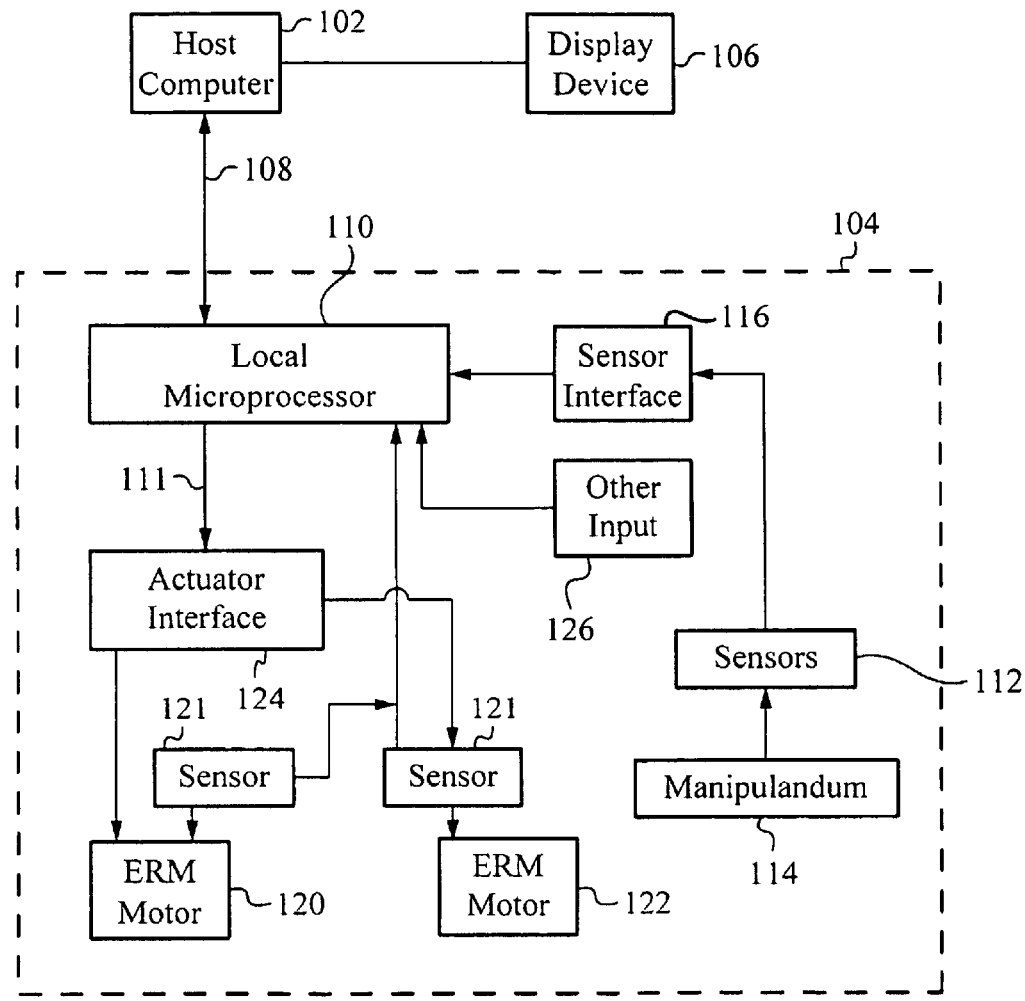
FIG. 2 is a block diagram illustrating a haptic system suitable for use with the present invention.

FIG. 2 is a block diagram illustrating a haptic system 100 suitable for use with the present invention. System 100 includes a host computer 102 and an interface device 104.

Host computer 102 is any of a variety of computing or electronic devices. In one preferred embodiment, computer 102 is a personal computer, game console, or workstation, such as a PC compatible computer or Macintosh personal computer, or game console system from Nintendo Corp., Sega Corp., Sony Corp., or Microsoft Corp. In other embodiments, host computer 102 can be a "set top box" which can be used, for example, to provide interactive television functions to users, or a "network-" or "internet-computer" which allows users to interact with a local or global network using standard connections and protocols such as used for the Internet and World Wide Web. Some embodiments may provide a host computer 102 within the same casing or housing as the interface device or manipulandum that is held or contacted by the user, e.g. hand-held video game units, portable computers, arcade game machines, etc. Host computer preferably includes a host microprocessor, random access memory (RAM), read only memory (ROM), input/output (I/O) circuitry, an audio output device, and other components of computers well-known to those skilled in the art. Other types of peripherals can also be coupled to host computer 102, such as storage devices (hard disk drive, CD ROM drive, floppy disk drive, etc.), printers, and other input and output devices.

A visual display device 106 is preferably connected or part of the computer 102 and displays visual images of a graphical environment, such as a game environment, operating system application, simulation, etc. Display device 106 can be any of a variety of types of devices, such as LCD displays, LED displays, CRT's, flat.panel screens, display goggles, etc.

Host computer 102 preferably implements a host application program with which a user is interacting via the interface device '104 and other peripherals, if appropriate. For example, the host application program can be a video game, word processor or spreadsheet, Web page or browser that implements HTML or VRML instructions, scientific analysis program, virtual reality training program or application, or other application program that utilizes input of device 104 and outputs haptic feedback commands to the device 104 (or a different layer can output such commands, such as an API or driver program on the host). The host program checks for input signals received from the electronics and sensors of device 104, and outputs force values and/or commands to be converted into forces output for device 104. Suitable software drivers which interface such simulation software with computer input/output (I/O) devices are available from Immersion Corporation of San Jose, Calif.

Several different layers of programs can be running on the host computer 102. For example, at an application layer, one or more application programs can be running, such as a game program, word processing program, etc. Several sublayers can also be provided, such as an Application Programming Interface (API) layer (e.g. used in Windows OS from Microsoft Corp.), and different driver layers. The application program can command forces directly, or a driver program can monitor interactions within an application program and command haptic effects when predetermined conditions are met. In one embodiment, a haptic feedback driver program can receive kinesthetic haptic commands from an application program and can map the commands to tactile inertial commands and effects, and then send the necessary information to the interface device 104.

Interface device 104 is coupled to host computer 102 by a bi-directional bus 108. The bi-directional bus sends signals in either direction between host computer 102 and the interface device. For example, bus 108 can be a serial interface bus, such as an RS232 serial interface, RS-422, Universal Serial Bus (USB), MIDI, or other protocols well known to those skilled in the art; or a parallel bus or wireless link. For example, the USB standard provides a relatively high speed interface that can also provide power to actuators of device 104.

Interface device 104 can, in many embodiments, include a local processor 10. Local processor 110 can optionally be included within the housing of device 104 to allow efficient communication with other components of the device. Processor 110 is considered local to device 104, where "local" herein refers to processor 110 being a separate processor from any processors in host computer 102. "Local" also preferably refers to processor 110 being dedicated to haptic feedback and sensor I/O of device 104. Processor 110 can be provided with software instructions to wait for commands or requests from host 102, decode or parse the command or request, and handle/control input and output signals according to the command or request. In some embodiments, processor 110 can operate independently of host computer 102 by reading sensor signals and calculating appropriate forces from those sensor signals, time signals, and stored or relayed instructions selected in accordance with a high level host command. Suitable microprocessors for use as local processor 110 include the MC68HC711E9 by Motorola, the PIC16C74 by Microchip, and the 82930AX by Intel Corp., for example, as well as more sophisticated force feedback processors such as the Immersion Touchsense™ Processor, current versions of which are used with personal computers such as PC's. Processor 110 can include one microprocessor chip, multiple processors and/or co-processor chips, and/or digital signal processor (DSP) capability. For example, the control techniques described for the present invention can be implemented within firmware of an Immersion TouchSense Processor, where the local microprocessor block 110 includes related components, such as encoder processing circuitry, communication circuitry, and PWM circuitry as well as a microprocessor. Various techniques for playing more sophisticated periodics and other sensations (such as defined by Immersion protocols) with a eccentric rotating mass (ERM) motor can be provided in the firmware of the processor 110.

Microprocessor 110 can receive signals from sensors 112 and provide signals to actuators 120 and 122 in accordance with instructions provided by host computer 102 over bus 108. The microprocessor 110 provides a control signal 111 to the actuators. In one embodiment, the control signal is a PWM signal the firmware of processor 110 can generate and send to the amplifier in actuator interface 124. There is preferably one control signal per motor.

In one local control embodiment, host computer 102 provides high level supervisory commands to microprocessor 110 over bus 108, and microprocessor 110 decodes the commands and manages low level force control loops to sensors and the actuator in accordance with the high level commands and independently of the host computer 102. This operation is described in greater detail in U.S. Pat. Nos. 5,739,811 and 5,734,373, both incorporated by reference herein. In the host control loop, force commands are output from the host computer to microprocessor 110 and instruct the microprocessor to output a force or force sensation having specified characteristics. The local microprocessor 110 reports data to the host computer, such as locative data that describes the position of the mouse in one or more provided degrees of freedom. The data can also describe the states of buttons or other devices of device 104. The host computer uses the data to update executed programs. In the local control loop, actuator signals are provided from the microprocessor 110 to the actuators and sensor signals are provided from the sensors 112 and other input devices to the microprocessor 110. The microprocessor 110 can process inputted sensor signals to determine appropriate output actuator control signals by following stored instructions. The microprocessor may use sensor signals in the local determination of forces to be output, as well as reporting locative data derived from the sensor signals to the host computer.

In yet other embodiments, other hardware can be provided locally to device 104 as processor 110 to provide functionality similar to a microprocessor. For example, a hardware state machine incorporating fixed logic can be used to provide signals to the actuators and receive sensor signals from sensors 112, and to output tactile signals according to a predefined sequence, algorithm, or process.

In a different, host-controlled embodiment, host computer 102 can provide low-level force commands over bus 108, which are directly transmitted to the actuator via processor 110 or other circuitry (if no microprocessor 110 is present). Host computer 102 thus directly controls and processes all signals to and from the device 104, e.g. the host computer directly controls the forces output by actuator 120 or 122 and directly receives sensor signals from sensor 112 and input devices 126. The host 102 can also stream force values that are sent to the actuators, as described in U.S. Pat. No. 5,959,613, incorporated herein by reference.

In the simplest host control embodiment, the signal from the host to the device can be a single bit that indicates whether to pulse the actuator at a predefined frequency and magnitude. In more complex embodiments, the signal from the host can include a magnitude, giving the strength of the desired pulse, and/or a frequency. A local processor can also be used to receive a simple command from the host that indicates a desired force value to apply over time, so that the microprocessor outputs the force value for the specified time period based on the one command. The host command may also specify an "envelope" to provide on a force output to allow force shaping, as disclosed in U.S. Pat. No. 5,959,613. A combination of numerous methods described above can also be used for a single device 104.

Local memory, such as RAM and/or ROM, can be coupled to processor 110 in device 104 to store instructions for processor 110 and store temporary and other data. In addition, a local clock can be coupled to the processor 110 to provide timing data, which might be required, for example, to compute forces output by actuator. In embodiments using the USB communication interface, timing data for processor 110 can be alternatively retrieved from the USB signal.

Sensors 112 sense the position or motion of a manipulandum 114 of the device 104 and provides signals to processor 110 (or host 102) including information representative of the position or motion. In some embodiments, the manipulandum is one or more small joysticks provided on a gamepad controller and moved by a user in two rotary or linear degrees of freedom to provide control input to the host computer. The manipulandum can also be a direction pad having four or more directions which can provide input to the host computer. The manipulandum can also be a rotary dial, linear slider, button, wheel, finger receptacle, cylinder, or other controlling member. The manipulandum can also be the housing of the device itself, as in the case of a mouse or if sensing the position of a gamepad or other controller in 3-D space. Sensors suitable for detecting motion of a joystick or other manipulandum include digital optical encoders frictionally coupled to a rotating ball or cylinder, as is well known to those skilled in the art. Mechanical switches, linear optical encoders, potentiometers, optical sensors, velocity sensors, acceleration sensors, strain gauges, or other types of sensors can also be used, and either relative or absolute sensors can be provided. Optional sensor interface 116 can be used to convert sensor signals to signals that can be interpreted by the processor 110 and/or host computer 102, as is well known to those skilled in the art.

Actuators 120 and 122 transmit forces to the user of the device 104 in response to signals or commands received from processor 110 and/or host computer 102. In the preferred embodiment, two or more actuators are provided, as described below. In one embodiment, these actuators are eccentric rotating mass (ERM) DC motors, which are rotary motors having an eccentric mass coupled to the rotating shaft of the motor. When rotated, the inertial forces from the rotating mass cause an oscillation or vibration in the housing or other member coupled to the motor housing, thus producing tactile sensations to the user who is holding or otherwise contacting the housing. Many different types of actuators can be used, e.g. any type of actuator which can rotate an eccentric mass in a direction, such as voice coil actuators, moving magnet actuators, hydraulic or pneumatic actuators, torquers, brushed or brushless motors, etc. Furthermore, additional actuators can be included to provide kinesthetic force feedback in the manipulandum 114. Linear actuators of all types may also be used, in which a mass or rotor is linearly oscillated to provide vibrations.

Sensors 121 are preferably provided for each actuator 120 and 122 to sense the position of the actuator shaft and/or eccentric mass coupled to the actuator. Examples of sensors 121 are detailed below. The sensors 121 allow the processor 110 or other controller to accurately control the rotation of the actuators and thus control the direction of output inertial forces, as described below.

Actuator interface 124 can be optionally connected between actuators 120 and 122 and processor 110 to convert signals from processor 110 into signals appropriate to drive the actuators. Interface 124 can include power amplifiers, switches, digital to analog controllers (DACs), analog to digital controllers (ADCs), and other components, as is well known to those skilled in the art. For example, in one embodiment the actuators 120 and 122 can be off-the-shelf ERM motors which are driven unidirectionally. Unidirectional voltage mode amplifiers are low cost components that can be used in actuator interface 124 to drive the motors. In bi-directional embodiments, appropriate bi-directional amplifiers and other components may be used.

Other input devices 118 are included in device 104 and send input signals to microprocessor 110 or to host 102 when manipulated by the user. Such input devices can include buttons, dials, switches, scroll wheels, or other controls or mechanisms. Power supply 120 can optionally be included in or coupled to device 104, and can be coupled to actuator interface 124 and/or actuators 120 and 122 to provide electrical power to the actuators. Alternatively, and more preferably, power can be drawn from the bus 108, e.g. using a USB or other bus. Also, received power can be stored and regulated by device 104 and thus used when needed to drive actuators 120 and 122 or used in a supplementary fashion. Because of the limited power supply capabilities of USB, a power storage device may be required in the mouse device to ensure that peak forces can be applied (as described in U.S. Pat. No. 5,929,607, incorporated herein by reference). For example, power can be stored over time in a capacitor or battery and then immediately dissipated to output a haptic sensation. Alternatively, this technology can be employed in a wireless device 104 which communicates with the host computer 102 via wireless signals, and in which case battery power can be used to drive the actuators.

Directional Output of Vibrations

The present invention provides multiple rotary actuators to allow directional tactile feedback to be output on the interface device. This allows the haptic feedback output from a tactile controller to more accurately correspond to events or interactions occurring within a graphical environment.

Using the present invention, vibrations can be output along two orthogonal axes, or along both axes simultaneously. These axes can be oriented in any way desired; for example, both axes may lie in the plane that is parallel to a ground surface, or one axis may be positioned in the "up-down" z-axis direction, orthogonal to the ground surface.

Figure 3:
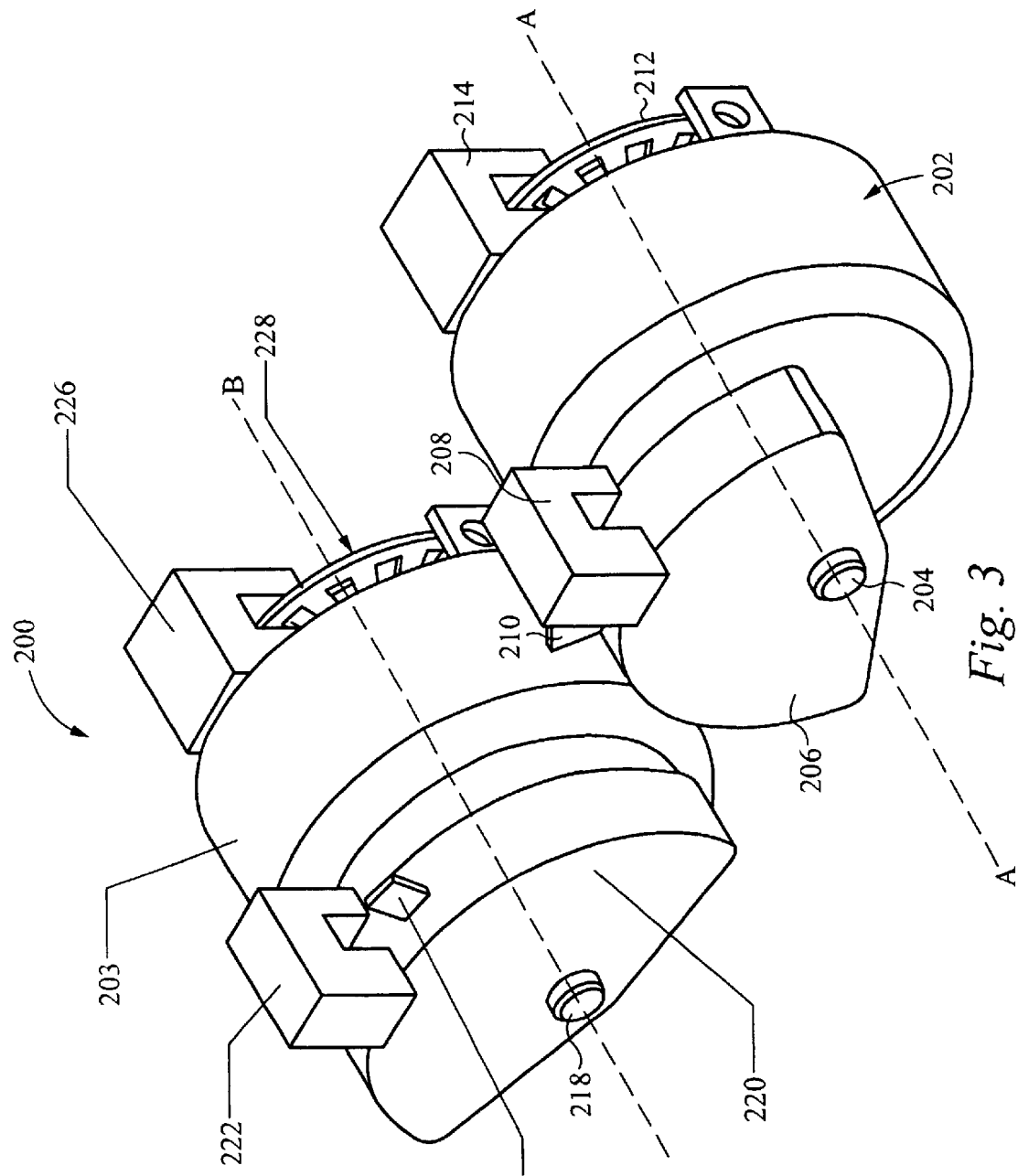
FIG. 3 is a perspective view of a first embodiment of an actuator system of the present invention providing directional tactile feedback.

FIG. 3 is a perspective view of a first embodiment 200 of an actuator system of the present invention providing directional tactile feedback. The actuator system 200 may be positioned within the interior housing of a tactile interface device such as a gamepad, mouse, remote control, handheld steering wheel, or other device. For example, the system 200 can be positioned at a center region of the interior of a device. In other embodiments, multiple systems 200 can be positioned in a single device, each system 200 outputting its own directional forces. For example, one system can be position at the left of a device to output directional forces on the left side, and a similar system can be positioned on the right side of the device.

System 200 includes an actuator 202 and an actuator 203. In the described embodiment, the actuators 202 and 203 are positioned side-by-side such that their axes of rotation are approximately parallel. Actuator 202 includes a rotating shaft 204 which rotates about axis A and is coupled to an eccentric mass 206. Mass 206 is rotated about axis A to create centrifugal forces that cause inertial vibrations in the housing of the device.

A sensor is also preferably coupled to the actuator 202 to detect the current position of the shaft 204 and the mass 206. The sensor can take a variety of forms. In one embodiment, the sensor can include a slotted optical switch 208 that includes an emitter and detector. The switch 208 is placed adjacent to the eccentric mass 206. A flag 210 can be fixed to the eccentric mass 206 so that the flag rotates through the switch 208 upon each revolution. The switch 208 thus generates a pulse each time the flag rotates through the switch. This sensor information informs a controller, such as a local microprocessor, host microprocessor, or other control device, the speed of rotation of the eccentric mass and allows the controller to adjust that speed, if necessary, to keep the masses of the actuators in synchronization and enable directional forces to be output, as explained below. Alternatively, the flag 210 can be positioned on a separate disk or other member coupled to the rotating shaft 204. Additional flags can also be fixed to the eccentric mass at different positions to allow a greater sensing resolution.

In another embodiment, the sensor can be an optical encoder, which can be positioned at one end of the actuator 202 as shown. The optical encoder includes an encoder disk 212 which is coupled to the shaft 204 and rotates therewith. An emitter-detector 214 is positioned around the encoder disk 208 as shown to detect the rotation of the disk, as is well known to those skilled in the art. The optical encoder is able to read the position of the shaft 204 and mass 206 with much greater precision and a resolution dependent on the spacing of the slots or marks on the encoder disk. This allows the controller to keep the rotating masses of the actuators in synchronization to a more precise degree than the sensor 208. Furthermore, the encoder disk can include a larger mark or slot or other distinguishing feature to allow the absolute sensing of mass position, similar to the switch 208 and flag 210. The resolution of the optical encoder need not be very high (e.g., every 45 degrees, or 8 steps per revolution), allowing a lower cost sensor to be used. Some embodiments can include both the optical switch 208/flag 208 (as an absolute sensor) and the optical encoder (as a higher resolution relative sensor).

Actuator 203 is similar to actuator 202, and includes a shaft 218 that is coupled to an eccentric mass 220 that rotates about an axis B. An optical switch 222 can be included to detect the passage of a flag 224 coupled to the mass 220, as described above. An optical encoder can also be provided, including an emitter-detector 226 and encoder disk 228.

Actuators 202 and 203 are preferably oriented so that the axes of rotation A and B are approximately parallel. Furthermore, the eccentric masses 206 and 220 are preferably oriented to rotate in approximately the same plane. This allows the forces output by the moving masses to combine in the desired manner, as described below. In other embodiments, additional actuators and sensors can be provided to increase the magnitude of output directional forces.

Figure 4:
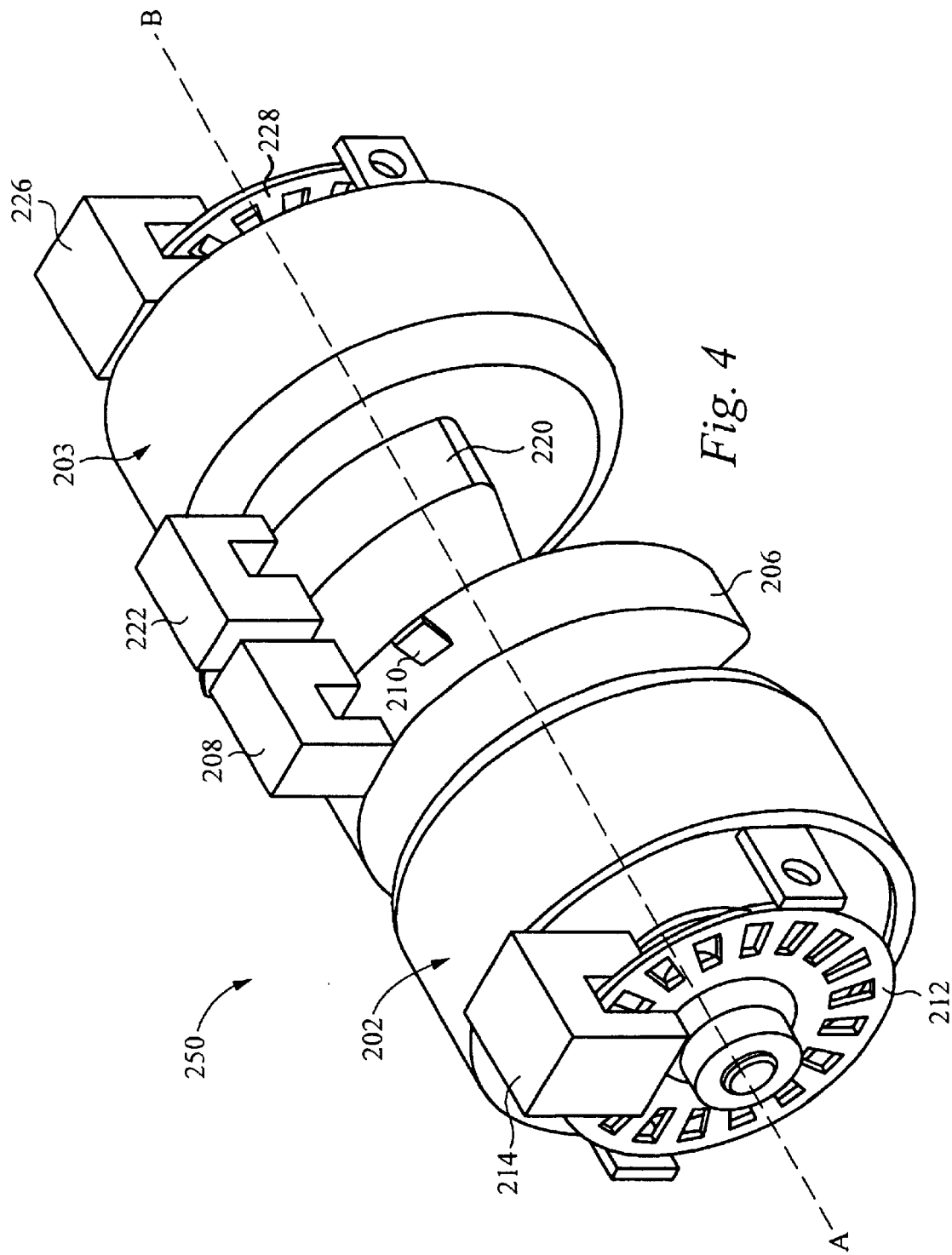
FIG. 4 is a perspective view of another embodiment of an actuator system of the present invention.

FIG. 4 is a perspective view of another embodiment 250 of the actuator system of the present invention. In system 250, the same actuators 202 and 203, as described with reference to FIG. 3, can be used. In this configuration, the actuators 202 and 203 are facing each other so that the axes of rotation A and B are approximately colinear, and where the eccentric masses are spaced closely together. This allows the forces provided by the spinning masses to combine to output directional resultant forces, as described in greater detail below. Although the spinning masses are not rotating exactly in the same plane but in planes parallel to each other, it is preferred that the planes of rotation be arranged close enough together that the two planes of rotation of the masses cause a resultant directional inertial force that is approximately in a single plane, at least as felt by the user.

Figure 5:
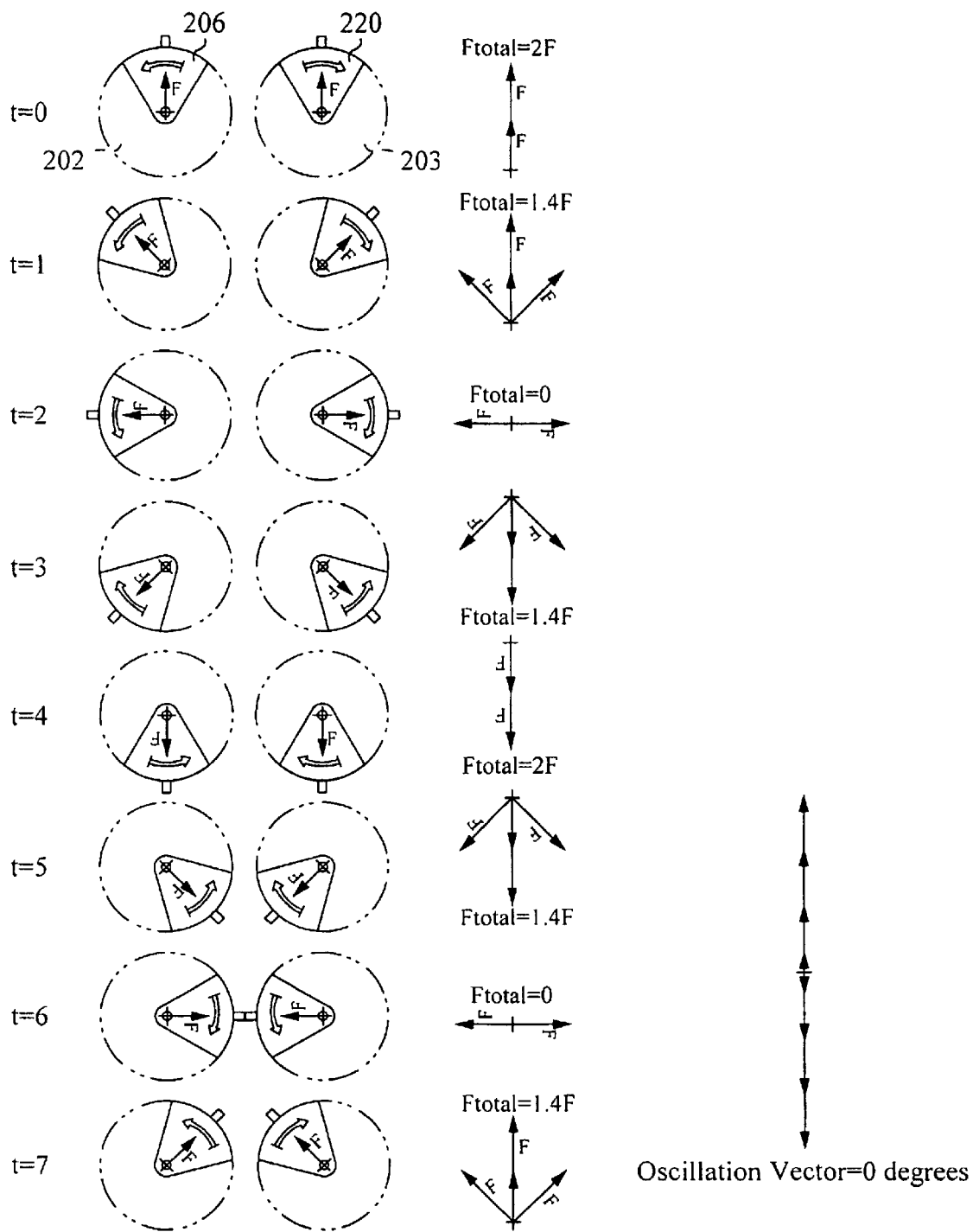
FIG. 5 is a side view of the actuators and their respective rotating eccentric masses at several different time steps and having a zero phase difference.

FIG. 5 is a side view of the actuators 202 and 203 and their respective rotating eccentric masses 206 and 220 at several different time steps and having a zero phase difference. The present invention is able to output directional forces by maintaining a constant phase difference between the rotating masses. The amount of phase difference determines the direction that the resultant force (oscillatory force) is output that results from the combination (vector summation) of the centrifugal forces from each mass. A controller such as a microprocessor can maintain the constant phase difference by reading the sensors coupled to the actuators that monitor the position of the eccentric masses as described above. The controller can thus control the direction of the periodic oscillation resulting from the actuator system over a full 360 rotational degrees. If the masses get out of synchronization, the controller can detect this and compensate by slowing down or momentarily stopping one of the masses until the desired phase difference is achieved.

At each step, the actuators 202 and 203 are shown side-by-side, as in FIG. 3. The masses 206 and 220 are rotated in opposite directions; in the shown figures, the mass 206 is rotated counterclockwise and the mass 220 rotated clockwise. In each figure, a direction of rotation is shown as well as a resultant centrifugal force F resulting from the rotation of the mass. In the column to the right of the figures, a resultant force is shown for each time step. In this Figure, the masses are synchronized and have a zero phase difference.

At time t=0, the masses 206 and 220 are in their starting positions, in which each mass is at a zero-degree position (the "up" direction in the figures). The masses can also be in this position after one or more rotations. If so, a resultant force having a magnitude of 2 F is output in the direction of 0 degrees. This resultant force is simply the addition of each force F due to the masses being in the same position. Preferably, if the masses have become unsynchronized, the controller (microprocessor, etc.) uses the sensors on the actuators to position the masses as shown, before rotation begins or continues.

At time t=1, the masses have each been rotated about 45 degrees in opposite directions. The resultant force has a magnitude of about 1.4 F in a direction of 0 degrees. Each force F has components along the 0-degree direction and a 90-degree direction, and the resultant force is the addition of the 0 degree components of each force F. The components along the 90-degree directions cancel each other since they are in opposite directions about the zero axis.

At time t=2, the masses have each rotated 90 degrees. The resultant force has a magnitude of 0, since the forces F from each mass are in opposite directions and cancel each other.

At time t=3, the masses have each rotated 135 degrees. The resultant force here has a magnitude of 1.4 F in the 180-degree direction (the "down" direction in the figures). This is similar to time step t=1 except the resultant force is in the opposite direction.

At time t=4, the masses have each rotated 180 degrees and are both positioned at the 180-degree position. Thus, their forces sum fully, and the resultant force has a magnitude of 2 F in the 180-degree direction, the opposite direction of the force at time t=0.

At time t=5, the masses have each rotated 225 degrees. The resultant force has a magnitude of 1.4 F in the 180-degree direction. This result is similar to time t=1, where the 180-degree components of the forces F add, while the 90-degree components cancel each other.

At time t=6, the masses have each rotated 270 degrees. The resultant force is 0 since the forces F from each mass fully cancel each other.

At time t=7, the masses have each rotated 315 degrees. The resultant force is 1.4 F in the 0-degree direction since the 90-degree components cancel each other.

As can be seen from the figures of FIG. 5, the resultant force for each position of the masses is either in the 0-degree direction or the 180-degree direction and is always along the same axis. This allows the microprocessor or other controller to rotate the masses and achieve a desired directional force along this axis, where the force experienced by the user is an oscillation along both directions of this axis. To provide directional forces along a different directional axis, a different phase difference between the masses should be used, as detailed below.

The same magnitude and direction of forces as described above can be output in the configuration of FIG. 4 as well. The representation of actuator 203 and mass 220 should, at each time step, be simply moved over the representation of actuator 202 and mass 206 so that the axes of rotation are colinear and the masses 206 and 220 are rotating in planes close together. Since the actuators are facing opposite directions in this configuration, the masses should be both rotated in the same direction (e.g., both clockwise or counterclockwise) with respect to each actuator, instead of in opposite directions, to achieve the resultant forces shown. The masses are not rotating exactly in the same plane, but are rotating in planes close enough (parallel to each other) so that the force vectors combine approximately as shown.

Figure 6:
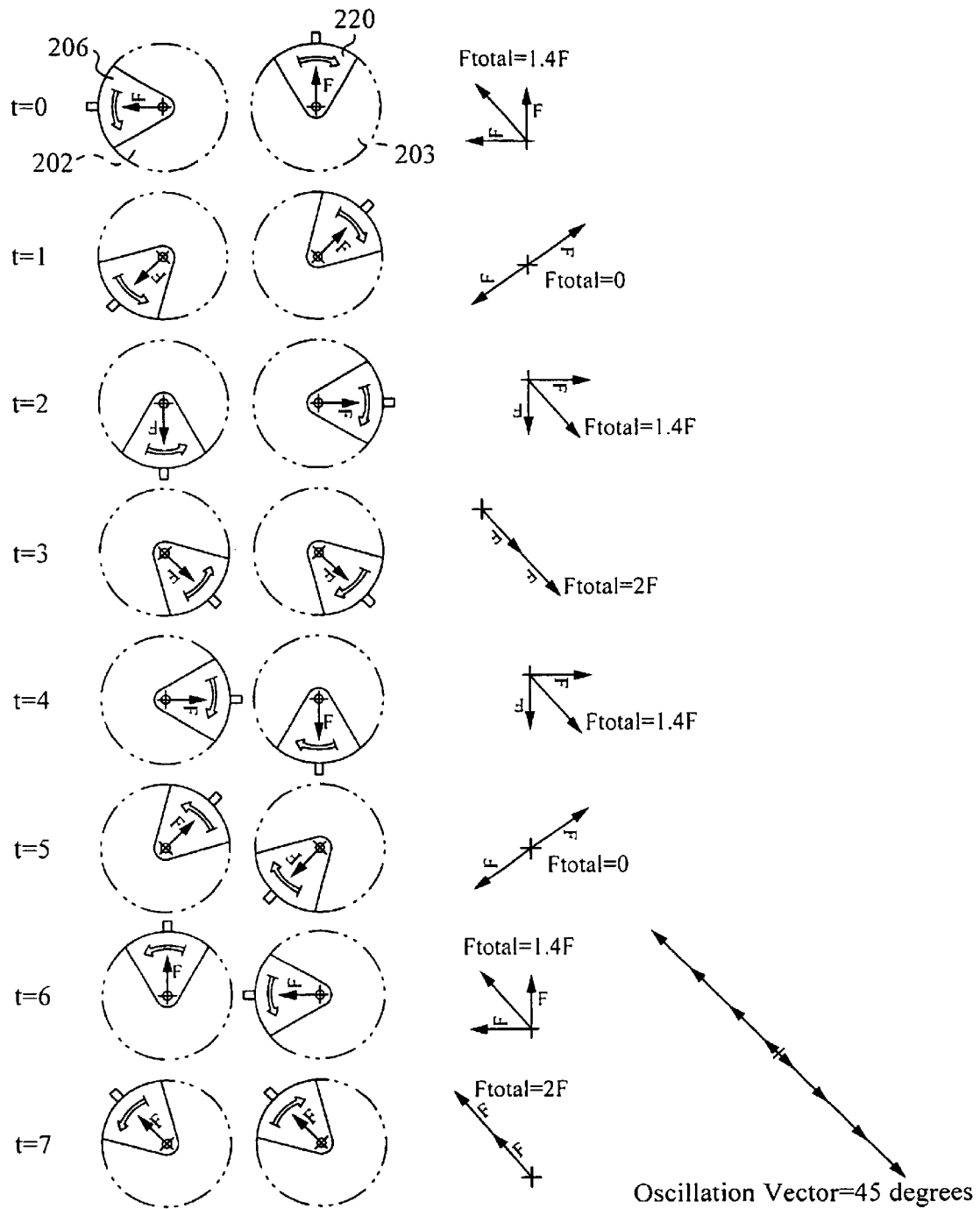
FIG. 6 a side view of the actuators and their respective rotating eccentric masses at several different time steps and having a 90-degree phase difference.

FIG. 6 illustrates a number of side views of the actuators 202 and 203 similar to FIG. 5, except that a phase shift of 90 degrees is provided between the eccentric masses 206 and 220 to allow diagonal forces to be output. Thus, the mass 206 can be positioned 90 degrees behind the mass 220 and this phase difference is maintained during the rotations of the masses. In other configurations, the mass 220 can be positioned 90 degrees behind the mass 206. As in FIG. 5, each mass contributes a force having a magnitude of F in a direction from the axis of rotation toward the center of the outer edge of the mass, in the plane of rotation of the mass. At time t=0, the mass 206 is positioned at 270 (−90) degrees from the 0-degree position, while the mass 220 is positioned at the 0-degree position. This provides a resultant force having a 1.4 F magnitude, in a direction of −45 degrees. This force results from the addition of the 0-degree force from mass 220 and the −90 degree force from mass 206.

At time t=1, the masses have each rotated 45 degrees from their starting positions, so that the mass 206 is positioned at the 225 (−135) degree position, while the mass 220 is positioned at the 45-degree position. The resultant force has a magnitude of 0, since the forces F from each mass are in opposite directions and cancel each other exactly.

At time t=2, the masses have each rotated 90 degrees, so that the mass 206 is positioned at the 180-degree position, while the mass 220 is positioned at the 90-degree position. The resultant force has a magnitude of 1.4 F in a direction of 135 degrees, which is similar to the result of t=0 but in the opposite direction.

At time t=3, the masses have each rotated 135 degrees, so that both the masses 206 and 220 are positioned at the 135-degree position. The resultant force has a magnitude of 2 F in a direction of 135 degrees, the summation of the forces F from the masses.

At time t=4, the masses have each rotated 180 degrees, so that mass 206 is positioned at the 90-degree position, while mass 220 is positioned at the 180-degree position. The resultant force has a magnitude of 1.4 F in the 135-degree direction, similar to the resultant force at time t=2.

At time t=5, the masses have each rotated 225 degrees, so that mass 206 is positioned at the 45-degree position, and mass 220 is positioned at the 225-degree position. The resultant force has a magnitude of 0 since the forces from each mass are in opposite directions and cancel each other.

At time t=6, the masses have each rotated 270 degrees, so that mass 206 is positioned at the 0-degree position, and mass 220 is positioned at the 270-degree position. The resultant force has a magnitude of 1.4 F in the 315-degree direction. This force is similar to the resultant force at time t=0; the mass positions have simply reversed from that time.

At time t=7, the masses have each rotated 315 degrees, so that both masses 206 and 220 are positioned at the 315-degree position. The resultant force has a magnitude of 2 F and is in the 315-degree (−45-degree) direction, since both masses are positioned in that direction.

Other positions of the masses not shown in the diagrams above will also provide forces in the same directions, at magnitudes between the magnitudes described above for the positions surrounding the position in question.

As seen from the above-described figures, the phase shift of 90 degrees between the masses allows oscillatory inertial forces to be output in the directions along the axis at the 45 degree/135-degree direction. This axis is offset 45 degrees from the axis of forces output when the phase difference is zero, shown in FIG. 5.

The forces from the rotation of the masses 206 and 220 can also be output along other directional axes. In a similar fashion as shown by FIGS. 4 and 5, a force in the directions along the 90 degree axis can be output by providing a phase shift of 180 degrees between the masses. A force in either direction along the 45-degree/225-degree axis can be output by providing a phase shift of 270 degrees between the masses. This allows directional forces to be output in eight total directions (four directional axes), which is sufficient in most situations to realistically simulate forces occurring from events or interactions in the displayed graphical environment. Furthermore, any arbitrary angle or direction of force in the plane of mass rotation can be output by providing an appropriate phase shift between masses. For example, directions between the 45-degree increments shown can be achieved with phase shifts of 45 degrees, 30 degrees, etc.

The control of the rotating actuators can be implemented in different ways. For example, if a local microprocessor is included on the interface device, the local microprocessor can monitor and maintain the phase difference between rotating masses independently of the host computer to free the host to perform other tasks. Furthermore, when using a local microprocessor, the host need only send high level commands which the local microprocessor can parse, interpret, and implement as appropriate. For example, the host microprocessor might send a high level command to output a vibration, where the vibration has the following high level parameters: frequency, magnitude, duration, and direction. Since the motors are preferably driven in only one direction to provide the directional forces described herein, a control signal to drive the actuators need only be a positive waveform that can be modulated with desired on-times at the desired frequency to achieve the desired magnitude and frequency of vibration, as disclosed in copending U.S. application Ser. No. 09/669,029, filed Sep. 25, 2000. In a simpler embodiment, the motors can be rotated at the commanded frequency and the magnitude command can be ignored so that each frequency will have a fixed, associated magnitude. The duration parameter is easily implemented by the microprocessor to output the vibration for the specified time period. Envelope parameters, such as attack and fade parameters, can also be specified in some embodiments to adjust the vibration magnitude at desired times, as described in U.S. Pat. No. 5,959,613, incorporated herein by reference. Impulse wave shaping can also be employed, as described in that same patent.

The direction parameter can be specified in the host command as a vector, e.g. in degrees. The microprocessor can process that direction into a desired phase shift between masses that would provide the desired direction (actually force oscillation along an axis oriented in that direction) by direct computation, look-up table, etc. Thus, if a direction of 45 degrees is specified, the local microprocessor can adjust the masses to have a phase shift of 90 degrees between them and then begin the rotation. In some embodiments providing only a discrete number of directions (e.g., eight), the local microprocessor can round a specified direction to the nearest direction able to be output by the device. In other control embodiments, the host computer can determine the phase difference and control signals to drive the actuators, and can output or stream the control signals directly to the actuators on the device over a communication bus, such as Universal Serial Bus (USB).

Some embodiments may also provide bi-directional control over each actuator. For example, one direction of rotation can be used to output inertial forces as described above, while the other direction of rotation can be used to position the masses to achieve a desired phase difference.

The directional inertial forces described above are oscillatory (harmonic) forces output along both directions of an axis. In other embodiments, a force in a single direction on an axis can be output. This is accomplished by controlling the masses to move in "pops" or short bursts, rather than in continuous motion. Thus, to provide a directional pop at the 0-degree position (the "up" position shown in FIGS. 5 and 6), the masses can be started at the 180-degree position and both quickly accelerated to the 0-degree position in unison, creating an inertial force in the "up" direction. The masses, however, are then decelerated gradually on the way back down to the 180-degree position, or are stopped or damped near the 0-degree position so that only the "up" force is felt. The pop can be repeated by accelerating the masses repeatedly in one direction and decelerating them in other directions.

While this invention has been described in terms of several preferred embodiments, it is contemplated that alterations, permutations and equivalents thereof will become apparent to those skilled in the art upon a reading of the specification and study of the drawings. For example, many different types of interface devices can be used with the features of the present invention, including gamepads, remote controls, joystick handles, mice, steering wheels, grips, knobs, or other manipulandums or devices. Furthermore, certain terminology has been used for the purposes of descriptive clarity, and not to limit the present invention. It is therefore intended that the following appended claims include alterations, permutations, and equivalents as fall within the true spirit and scope of the present invention.

What is claimed is:

1. An apparatus comprising:
    a housing; and
    a plurality of actuators coupled to the housing, the plurality of actuators configured to produce inertial forces in response to control signals, each actuator from the plurality of actuators having a shaft and an eccentric mass coupled to the shaft, each actuator from the plurality of actuators being configured to move its eccentric mass, the plurality of actuators including at least a first actuator and a second actuator, the first actuator and the second actuator being configured to output collectively a net inertial force in a selected direction, the selected direction being associated with a phase difference between a phase of the first actuator and a phase of the second actuator.

2. The apparatus of claim 1, wherein the selected direction is associated with an event within a graphical environment.

3. The apparatus of claim 1, wherein the selected direction is one of a plurality of directions along which the net inertial force can be substantially directed.

4. The apparatus of claim 1, wherein each actuator of the plurality of actuators includes a sensor configured to detect a rotational position of the eccentric mass of the actuator.

5. The apparatus of claim 1, wherein the eccentric mass of the first actuator is configured to rotate in a direction, and the eccentric mass of the second actuator is configured to rotate in a direction opposite the direction of the first actuator.

6. The apparatus of claim 1, wherein the plurality of actuators are positioned substantially side-by-side such that axes of rotation of said eccentric masses are approximately parallel.

7. The apparatus of claim 1, wherein the plurality of actuators are positioned such that the axes of rotation of said eccentric masses are approximately collinear.

8. The apparatus of claim 1, further comprising:
    an interface device; and
    a host computer coupled to the interface device, the host computer configured to provide high level commands to the interface device.

9. The apparatus of claim 8, wherein the host computer includes a video game console and is associated with a graphical environment, the inertial forces being associated with events in the graphical environment.

10. The apparatus of claim 8, wherein the selected direction is associated with a direction of a graphically represented collision occurring within the graphical environment.

11. The apparatus of claim 8, wherein the control signals are from a controller associated with the interface device, the controller includes a local microprocessor, the local microprocessor configured to receive a high level command including a direction parameter from the host computer, the host computer configured to provide a graphical environment.

12. A method comprising:
    receiving a signal at a first actuator having an eccentric mass, the signal for the first actuator being associated with a phase;
    receiving a signal at a second actuator having an eccentric mass, the signal for the second actuator being associated with a phase different from the phase for the first actuator; and
    moving the eccentric mass of the first actuator and the eccentric mass of the second actuator simultaneously to output collectively a net force in substantially one direction, the direction being associated with a phase difference between the phase of the first actuator and the phase of the second actuator.

13. The method of claim 12, further comprising:
    monitoring a position of the first eccentric mass and a position of the second eccentric mass during the moving; and
    maintaining the phase difference between the first eccentric mass and the second eccentric mass based on the monitoring.

14. The method of claim 12, wherein the first eccentric mass and the second eccentric mass are rotated approximately within a single plane.

15. The method of claim 12, wherein the first eccentric mass and the second eccentric mass are rotated approximately along the same rotational axis.

16. An apparatus comprising:

a housing; and a plurality of actuators coupled to the housing, the plurality of actuators configured to produce haptic feedback in response to control signals, each actuator from the plurality of actuators having an associated phase, a shaft, and an eccentric mass coupled to and offset from the rotating shaft, each actuator from the plurality of actuators being configured to rotate its eccentric mass simultaneously with the remaining actuators from the plurality of actuators such that the haptic feedback is produced in a selected direction associated with the phase difference between the associated phases of the plurality of actuators.

17. The apparatus of claim 16, wherein the selected direction of the haptic feedback is in a plane of rotation defined by the eccentric mass of each actuator from the plurality of actuators.

18. The apparatus of claim 16, wherein the haptic feedback is output in only a single selected direction.

19. The apparatus of claim 16, wherein each actuator from the plurality of actuators includes a sensor configured to detect a rotational position of the associated eccentric mass.

20. The apparatus of claim 16, wherein the plurality of actuators includes a first actuator and a second actuator, the eccentric mass of the first actuator configured to rotate in a direction, the eccentric mass of the second actuator configured to rotate in a direction opposite the direction of the first actuator.

21. The apparatus of claim 16, wherein the plurality of actuators are positioned substantially side-by-side such that axes of rotation of the associated eccentric masses are approximately parallel.

22. The apparatus of claim 16, wherein the plurality of actuators are positioned such that axes of rotation of the associated eccentric masses are approximately collinear.

* * * * *